Nov. 15, 1966   H. L. DOBRIKIN   3,285,673
LOAD MODULATION AND RELAY STRUCTURE
Filed Nov. 23, 1964   2 Sheets-Sheet 1

INVENTOR.
Harold L. Dobrikin,
BY Parker & Carter
Attorneys.

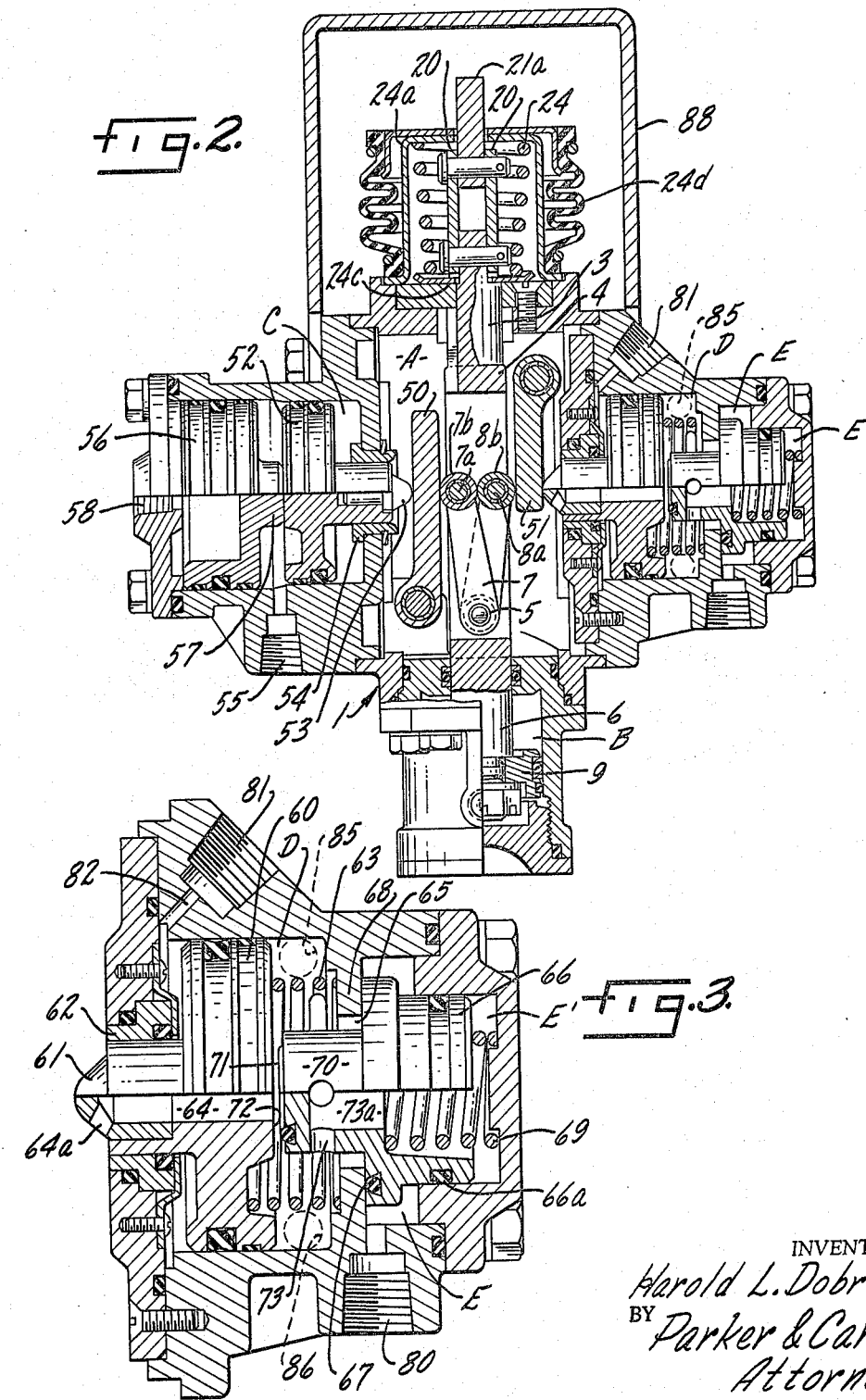

United States Patent Office 3,285,673
Patented Nov. 15, 1966

3,285,673
LOAD MODULATION AND RELAY STRUCTURE
Harold L. Dobrikin, Highland, Ill., assignor, by mesne assignments, to Berg Mfg. & Sales Co., Des Plaines, Ill., a corporation of Illinois
Filed Nov. 23, 1964, Ser. No. 413,168
14 Claims. (Cl. 303—22)

This invention relates to vehicle brake systems and has particular relation to a structure effective to control braking action in relation to the effective load carried by the vehicle.

One purpose of the invention is to provide a load-modulation structure sensitive enough to detect and react to load variations and deflections in the order of as little as $\tfrac{1}{32}$ inch.

Another purpose is to provide a load-modulation structure having an ability to detect and respond to a minute continued load deflection of the order of $\tfrac{1}{32}$ inch and yet capable of absorbing momentary deflections, due to vibration, uneven road surface and the like, of as much as plus-or-minus 6 inches.

Another purpose is to provide a load-modulation structure wherein a pair of springs are so designed, positioned and related as to operate within a range effective to eliminate the effect of friction within the structure upon the result produced thereby.

Another purpose is to provide a load-modulation structure having elements providing a fixed reference length unaffected by internal valve friction.

Another purpose is to provide a load-modulation structure effective to modulate an emergency brake application on the trailer of a truck-trailer vehicle.

Another purpose is to provide a load-modulation structure automatically self-adjustable in response to weight transfer effects occurring when a vehicle experiences rapid deceleration.

A long existing problem in the truck-vehicle field has been the difficulty of stopping, in a minimum distance, an empty vehicle with a brake system designed for loaded vehicles weighing five to seven times as much. To date only the driver's skill in brake application could avoid a locking of the rear vehicle wheels of trailers, for example, and truly short stops of lightly-loaded or empty vehicles were impossible. Rear wheel lock produced tire wear, removal of tire material good for many miles, flat spots which in turn produced vibration, sliding tires which lengthened stopping distance, shuddering which in turn produced damaged cargo, loosening of body fastenings, suspension wear and damage to pavement, and jackknifing resulting in complete loss of control leading to numerous accidents and fatalities. Accordingly, it is one purpose of the present invention to produce a load-modulation structure effective to eliminate the requirement for driver skill in avoiding rear-wheel lock and its effects and, at the same time, effective to reduce the stopping distance of lightly loaded vehicles.

Another purpose is to provide a load-modulation structure automatically effective to modulate braking forces delivered to the brakes of each axle of a vehicle in proportion to the load on that axle.

Another purpose is to provide a load-modulation structure effective to produce reduction in high cost maintenance factors, a lengthening of brake life and a reduction in brake drum damage.

Another purpose is to provide a load-modulation structure having an automatic fail-safe function whereby normal maximum service brake pressure is made available upon inoperativeness of said structure.

Another purpose is to provide a load-modulation structure effective to permit a vehicle operator to apply the brakes of the vehicle in the same manner and with the same brake pedal foot pressure at all times regardless of the weight of the vehicle.

Another purpose is to provide a load-modulation structure employing a lever arm to sense the effect of load changes of the vehicle and to meter the braking force in proportion to said changes.

Another purpose is to provide a load-modulation structure having a minimum of parts to avoid restricted air flow and to insure prompt and rapid response.

Another purpose is to provide a load-modulation structure permitting discard of external relay valves.

Another purpose is to provide a load-modulation structure of maximum accuracy and rapid response.

Load-modulation linkages and structures have been provided in which a yielding member, such as a spring, is employed in sensing changes in the distance between the vehicle axle and the vehicle body, herein referred to as "load deflection." Such devices, however, have been insufficiently sensitive, due to internal friction of valves controlled thereby, to meet the requirements of modern vehicle suspension designs. Accordingly, it is one purpose of the invention to provide a load-modulation structure effective to overcome and render irrelevant the internal friction of valve mechanisms employed therewith.

Another purpose is to provide a combination relay and modulation structure operable by both a service and an emergency brake pressure system.

Another purpose is to provide a relay-modulation structure having means for modulating the pressure forces relayed thereby and alternate means for relaying the full pressure delivered thereto.

Other purposes will appear from time to time during the course of the specification and claims.

The invention is illustrated more or less diagrammatically in the accompanying drawings, wherein:

FIGURE 2 is a view taken on the line 2—2 of FIGURE 1; and

FIGURE 3 is a cross-sectional detail view on an enlarged scale of a portion of FIGURE 2.

Like parts are indicated by like numerals throughout the specification and drawings.

Figure 1:
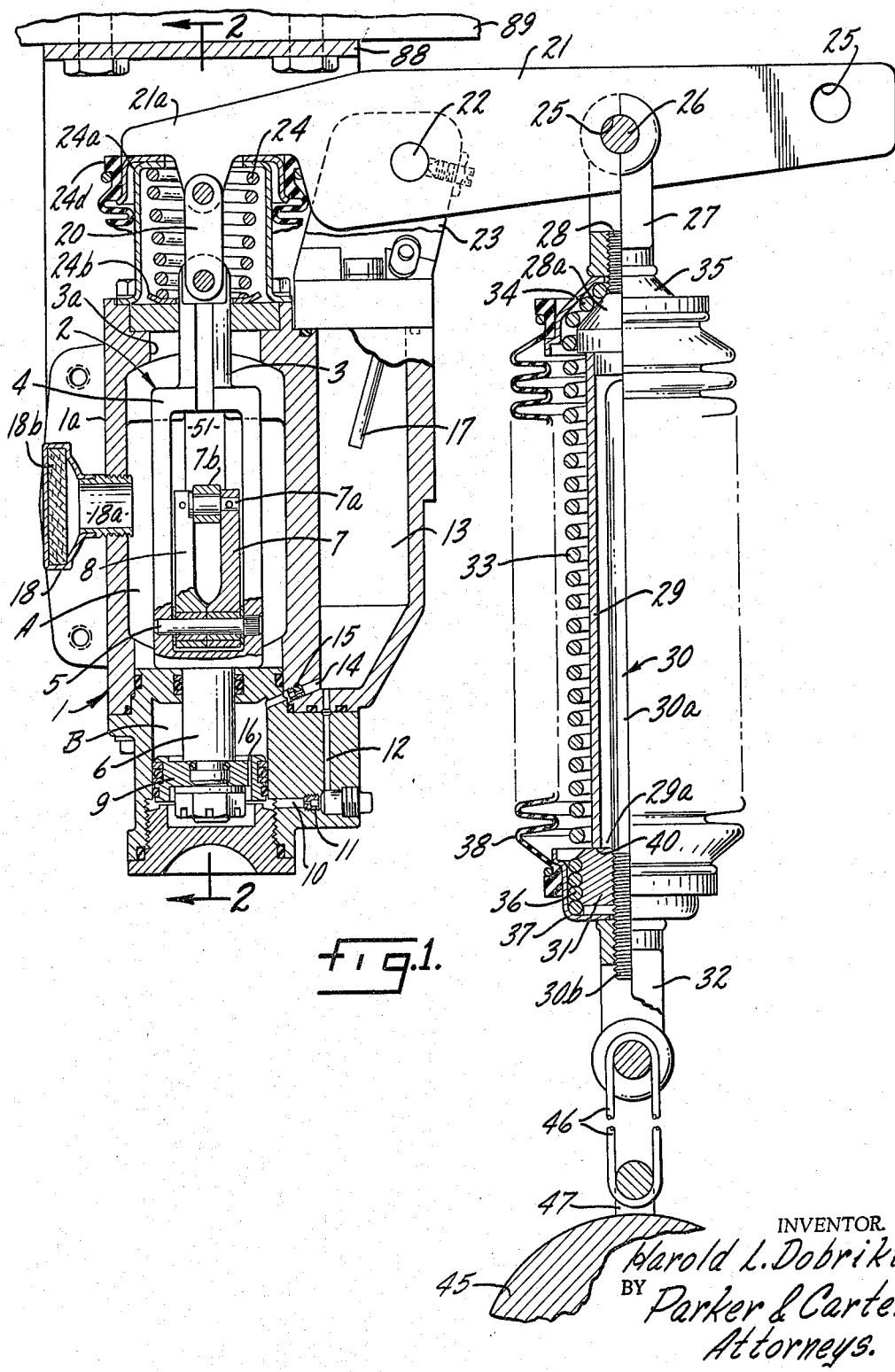
FIGURE 1 is a side elevation with parts shown in cross section.

Referring now to the drawings, and particularly to FIGURE 1, numeral 1 generally designates a housing. Within the housing is a central chamber A. Reciprocal within the housing chamber A is a movable fulcrum assembly indicated generally by the numeral 2. The assembly 2 includes an end arm or shaftlike portion 3 extending through an aperture 3a in the housing 1 and externally thereof. Within chamber A the assembly 2 includes a yoke or bifurcation portion 4 extending a substantial distance in the chamber A from the arm 3. The parallel portions of the yoke 4 have at their ends opposite the arm 3 a pin 5 extending therebetween. The arms of the yoke 4 are joined beyond the pin 5 in a second end arm or shaft extension 6.

Pivoted individually on the pin 5 are a pair of roller arms 7, 8 lying in parallel planes and extending back in yoke 4 toward arm 3. Each of the roller arms 7, 8 carries at their ends opposite the end pivoted on pin 5 a second pin 7a, 8a respectively. Each pin 7a, 8a carries a roller 7b, 8b, respectively, the rollers 7b, 8b being in overlying, contacting relationship.

The end shaft portion 6 extends into a dampener chamber B and carries at its outer end a dampener piston 9. Beyond the piston 9 the chamber B, in which piston 9 is reciprocal, communicates with an oil passage 10. A flow restrictor 11 is positioned in passage 10. Beyond the restrictor 11 passage 10 communicates with a branch passage 12 which in turn communicates with an oil reservoir 13 in housing 1. An opposite end portion of the chamber B, on the opposite side of piston 9 from passage 10, is communicated with reservoir 13 by passage 14 in which a restrictor 15 is positioned. A restricted passage 16 is formed through piston 9 for limited passage of oil from one to the other side of piston 9 within chamber B as piston 9 reciprocates therein. Indicated at 17 is a dip stick measuring device insertable into reservoir 13 for determining the level of dampening oil therein.

A side wall 1a of housing 1 has positioned generally centrally therein a holder 18. The holder 18 has a central passage or bore 18a which communicates with the chamber A and exposes the same to an air permeable filter member 18b carried by holder 18. It will be observed that the holder 18 is inserted in the wall 1a of housing 1 in alignment with the position of the fulcrum rollers 7a, 8a as the parts are shown in the drawings and serves as an exhaust port for chamber A.

Outwardly of the housing 1 a link 20 pivotally connects the extending portion of shaft end 3 with one end portion 21a of a lever arm 21. The lever arm 21 is itself pivoted, intermediate its ends, on a pivot shaft 22 which is in turn carried by a bracket 23 mounted on housing 1. A yielding means 24 is retained by an inverted cup retainer 24a secured to housing 1 and engages a second retainer such as the washer 24b which is in turn keyed to shaft 3 as indicated best in FIGURE 2 at 24c. Thus spring 24 urges assembly 2 inwardly of housing 1 and movement of assembly 2 outwardly thereof compresses spring 24. A shielding boot 24d surrounds cup 24a and has one of its ends carried by lever 21 for elongation of boot 24d as lever end portion 21a moves away from housing 1.

Beyond the pivot point 22 of lever 21 from the portion 21a the lever 21 carries a plurality of lineally spaced apertures at 25. Through one of the apertures 25 a clevis pin 26 extends for pivotal engagement with a clevis 27. A bolt 28 threadably engages the clevis 27 and has an outwardly flared conical head 28a spaced beyond the clevis 27. The flared head 28a carries, in axial alignment therewith and extending therefrom, an elongated hollow tube 29. A rod member 30 has a head 31 secured adjacent one end thereof and includes an elongated rod portion 30a extending from the head 31 through the open end 29a of tube 29 and into the tube 29 a substantial distance. Beyond the head 31, the opposite end 30b of rod member 30 carries a second clevis 32. A yielding means, such as spring 33, has one set of its end coils, as indicated at 34 engaging the outwardly flared outer surface of head 28a and held thereagainst by a cap 35. At its opposite end a series of end coils 36 of spring 33 engage the head 31 and a second cap 37 surrounds said end coils 36. A flexible shield or boot 38 has its opposite ends suitably clamped against the caps 35, 37 and surrounds the spring 33, tube 29 and rod member 30. It will be observed that the head 31 abuts the end surface of tube 29 as indicated at 40 when the parts are in the position shown in the drawings and that the free length of spring 33 is less than the combined length of the telescoping members 29 and 30 and that the spring 33 is thus continuously extended, prestretched or preloaded for purposes described in greater detail hereinbelow.

Indicated schematically at 45 is a vehicle axle. A flexible cable 46 is secured in any suitable manner, such as by the bracket 47, to axle 45 and to clevis 32.

Referring now in particular to FIGURE 2, it will be observed that a pair of flexible fulcrum arms 50, 51 are, respectively, pivoted to housing 1 within chamber A at spaced points therein and extend in overlying relationship for engagement of their inner opposed surfaces by rollers 7b, 8b, respectively.

A piston 52 is reciprocal in a subchamber C of housing 1 and carries an extension 53 which extends from one side of piston 52 through a bushing 54 into chamber A for engagement with the outer surface of arm 50. A fluid pressure inlet 55 is formed in housing 1 for delivery of fluid pressure to chamber C and to the opposite side of piston 52 from that carrying extension 53. Reciprocal in chamber C beyond the inlet 55 from piston 52 is a second piston 56. One face of piston 56 carries an extending abutment 57 for engagement with the surface of piston 52 opposite that carrying extension 53. The opposite face of piston 56 opposes a second fluid pressure inlet 58.

A third piston 60 is reciprocal in a fourth chamber D. The piston 60 carries an extension 61 which extends into chamber A for engagement with the outer or opposite surface of arm 51 from that engaged by roller 8b. Extension 61 is slidable in an appropriate seal 62. A yielding means 63 engages the surface of piston 60 opposite that carrying extension 61 to urge piston 60 toward chamber A and to urge extension 61 against arm 51. A passage 64, 64a is formed axially in and through piston 60 and laterally through the side wall of extension 61 to communicate the area of chamber D beyond piston 60 from extension 61 with the chamber A. A passage 65 communicates chamber D with a fifth chamber E in which a fourth piston 66 is reciprocal. The piston 66 carries a valve seal or seat member 67 effective to close the passage 65 when piston 66 is seated on the annular flange 68 defining valve passage 65 and forming a seat for member 67. A yielding means 69 is positioned in chamber E to urge the piston 66 toward seat 68. The opposite surface of piston 66 from that engaged by spring 69 carries an extension 70 which extends through passage 65 and into chamber D. The end surface of extension 70 carries a valve seal or member 71 positioned for engagement with a valve seat surface 72 formed on piston 60 about the mouth of passage 64.

A passage 73, 73a is formed in extension 70 and piston 66 and effective to communicate chamber D with the area of chamber E beyond piston 66 from the valve seal 67, the said area of chamber E being in turn sealed by a seal 66a carried by piston 66 and engaging the inner wall surface of reduced chamber portion E'.

A third fluid pressure inlet 80 is formed in housing 1 for communication with chamber E and with chamber D, through passage 65 when valve seal 67 is off its seat 68. A fourth inlet 81 is formed in the housing 1 and communicates through passage 82 with the side of piston 60 from which extension 61 extends and with chamber D on said side of said piston 60.

Shown in dotted lines at 85 and 86 are fluid pressure outlets adapted for connection to suitable conduits for conducting air pressure to the air brake applying chambers of the vehicle, the said outlets being variable in number but normally number four.

A suitable bracket, such as that indicated at 88, is provided for attachment of the load-modulation and relay structure to the vehicle body, a portion of the latter being indicated at 89.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

It will be understood that a service brake pressure line may be connected to inlet 55 and an emergency brake pressure line may be connected to inlet 58. In particular installations it may prove effective to reverse said connections. Tank or reservoir pressure is connected in communication with inlet 80. Inlet 81 is provided for connection with the emergency brake pressure line for particular installations as set forth in more detail hereinbelow.

It will be understood that the emergency brake pressure line may be connected alternately with inlet 81 or with either of inlets 55, 58, the inlet not so employed being plugged.

Assuming, for example, that the service pressure line is connected to inlet 55 and the emergency pressure line connected to inlet 58, with the inlet 81 plugged, it will be understood that a manually operable brake pedal (not shown) is provided with the vehicle for controlling delivery of service fluid pressure to inlet 55. Upon actuation of said brake pedal by the vehicle operator, fluid pressure delivered to inlet 55 enters chamber C and produces motion of piston 52 toward chamber A. Motion of piston 52, through the mediacy of extension 53, arm 50, rollers 7b, 8b, arm 51 and extension 61, produces a movement of piston 60 toward piston 60. Almost immediately after initiation of said movement, piston 60 engages seal 71 and closes passage 64, 64a in piston 60. Continued movement of piston 60 causes unseating of valve seal 67 from its seat 68 and a consequent passage of fluid pressure from the tank or reservoir in communication with inlet 80 through chamber E, passage 65 and into chamber D from whence said fluid pressure moves through outlets 85, 86 to the brake-applying chambers (not shown) of the vehicle.

As the parts are shown in the drawings, with the rollers 7b, 8b located in direct alignment with piston extensions 53, 61, the ratio of movement of pistons 52 and 60 is a one-to-one ratio. It will be understood that the unseating of valve seal 67 from seat 68 controls the fluid pressure delivered to outlets 85, 86 and thus to the brakes of the vehicle.

Similarly, considering the emergency brake pressure system as connected to inlet 58, actuation of said emergency system will deliver fluid pressure to the opposed side of piston 56. Movement of piston 56 away from inlet 58 in response to said pressure causes concurrent movement of piston 52 through the mediacy of extension 57 and the action of the structure of the invention from that point on follows the sequence above described.

Considering the emergency fluid pressure source as being connected to inlet 81, however, actuation of the emergency system produces a direct delivery of emergency fluid pressure to inlet 81 and passage 82 and thus to the side of piston 60 from which extension 61 extends. Fluid pressure thus delivered causes an immediate movement of piston 60 toward piston 66, or to the right as the parts are shown in FIGURES 2 and 3. The initial movement of piston 60 closes passage 64, 64a and continued movement thereof unseats valve seal 67 of piston 66 from seat 68, thus providing communication between the tank pressure connected to inlet 80, through chamber E, passage 65, chamber D and outlet 85, 86 to the brake-applying chambers of the vehicle. It will thus be realized that provision of emergency fluid pressure at inlet 81 is effective to by-pass the modulating effect of elements 50, 7b, 8b, 51 and to provide a direct application of full tank pressure to the brakes of the vehicle.

Thus the structure of the invention provides a choice between modulated service-and-emergency brake pressures and modulated service with non-modulated emergency brake pressures.

It will be understood that, following application of fluid brake pressure and release thereof, fluid pressure will remain in the vehicle brake-applying chambers (not shown) and conduits connected to outlets 85, 86, as well as in chamber D. Upon said release, spring 63 is effective to return piston 60 to the position indicated in FIGURES 2 and 3. Spring 69 returns piston 66 to said position. The resulting separation of pistons 60 and 66 opens passage 64, 64a to chamber D and thus provides an exhaust outlet into chamber A from whence said exhaust pressure flows through holder 18 and filter 18b to atmosphere.

It will be realized that movement of roller 7b, 8b from the position shown in FIGURE 2 will produce a corresponding variation between the amount of force imparted by piston 52 to arm 50 and the amount of force transmitted thereby to arm 51 and pistons 60, 66. Thus the vehicle operator, though employing substantially identical actuations of the brake pedal of the vehicle, will produce variable fluid pressures delivered from inlet 80 to outlets 85, 86, depending upon the position of rollers 7b, 8b. As the parts are shown in the drawings, the vehicle is fully loaded, elements 31 and 29 are abutting and rollers 7b, 8b are at the position to which they are urged by spring 24 and are thus positioned for automatic application of full brake pressure to the brakes of the vehicle.

Thus it will be observed that the movable fulcrum structure 2 is shown in the drawings at one end of its travel. When the movable fulcrum structure 2 is in said position, the head 31 is in abutting relation with the tube 29, as indicated at 40 in FIGURE 1. The abutment of members 31, 29 provides a positive limit. The force of spring 24 is predetermined and related to spring 33. With the members 30, 29 telescoped to the shortest combined length, as shown in FIGURE 1, the spring 33 is nonetheless stretched or preloaded as illustrated. Said prestretching provides and maintains a fixed force in spring 33. In the absence of friction within the structure of the relay-modulation assembly within housing 1, the springs 24, 33 might be set to balance lever 21. Since friction is of course, present, the presetting or preloading of spring 33 provides a positive and continuously present force effective to overcome the effect of the combined force of spring 24 and frictional forces within housing 1. It has been found effective, for example, to preset or preload the spring 33, with parts in the position shown, at a force of the order of 50 pounds, with spring 24 having a force, say of 25 pounds, though in particular installations it is possible to preset spring 33 at substantially higher forces.

Should the vehicle encounter a hole in the pavement the axle 45 would be separated from vehicle body 89, thus stretching spring 33 and separating members 29, 31. Such action is, however, only momentary and is resisted by the dampener structure indicated at B and 9–16 and is absorbed by spring 33 without effect on assembly 2. Similarily, if a bump is encountered, axle 45 would approach body 89 momentarily but without effect on the structure of the invention since flexible cable 46 would merely be flexed. Since such action is also but momentary and dampened as above indicated, any effect on the braking forces delivered to the vehicle brakes is nullified, even though the hole or bump may involve a depth or height of as much as six inches.

With the vehicle lightened below its maximum weight, the axle 45 and vehicle body 89 would be separated or drawn apart by the air or spring suspension system (not shown) of the vehicle. Such separation would tend, through the mediacy of cable 46, to separate members 29 and 30. Such separation would be resisted by spring 33 and thus lever 21 would be drawn toward axle 45 and thus rotated on pivot 22 in a clockwise direction as the parts are shown in the drawings. Since the area of operation of spring 33 is beyond that of spring 24 and the friction within housing 1, the movement of lever 21 would be direct in response to the attempted stretching of spring 33. Thus the movable fulcrum assembly 2, including rollers 7b, 8b individually pivotally carried thereon by pivoted arms 7, 8, would be moved in a direction toward the body 89, as the parts are shown in the drawings, and rollers 7b, 8b would be moved along arms 50, 51 to vary the ratio of forces transmitted between pistons 52 and 60 and thus to provide for the delivery of less pressure through inlet 80, chamber E, passage 65, chamber D and outlets 85, 86 to the brakes for any given movement of piston 52 made in response to operator-controlled delivery of service pressure at inlet 55 or inlet 58 or the delivery of emergency pressure at either inlet 55 or inlet 58.

If the sensing structure 27–32 and 46 should become disconnected or fail, it will be clear that spring 24 will return fulcrum assembly 2 to the position shown, thus providing a one-to-one ratio between movement of pistons 52 and 60 and a consequent delivery of standard or maximum braking pressure to the brakes of the vehicle.

Since the structure illustrated in FIGURE 3 constitutes an effective relay valve and its operation by piston 52 is modulated in proportion to vehicle weight, it will be seen that separate relay valves are obviated.

The maintenance of a minimum extended length or preload in spring 33 insures that the force curve of spring 33 begins at a predetermined loading point (say 50 pounds). Thereafter the force of spring 33, as elements 29, 30 attempt to separate, increases on a straight line curve according to the rate of the spring and the amount it may be stretched. Without the initial stretch or prestressing of spring 33 its operating force curve would begin at zero. Because of internal friction, the load-modulation relay valve structure would not be sufficiently sensitive to meet the demands of American suspension systems and designs in which total deflection or space-variation between vehicle body and axle is of the order of one half inch between fully loaded and empty configurations. The structure of the invention is effective to sense and correspondingly modulate brake pressures in response to deflections of $\frac{1}{32}$ of an inch.

Thus is provided a load-modulation and relay structure having a sensing assembly effective to eliminate friction effects, capable of maximum rapid response, sensitive to minute, relatively continuous load changes, insensitive to momentary effects of relative vehicle-axle movements and having alternate emergency connections for modulation or non-modulation of emergency pressures, along with pivotally carried rollers constituting a movable fulcrum.

There is claimed:

1. A load-modulation structure for vehicle brake systems including a housing, a movable fulcrum in said housing, a fulcrum lever structure positioned in said housing for engagement with said fulcrum, means in said housing responsive to delivery of fluid pressure for moving said fulcrum lever structure, a fluid pressure inlet in said housing, a fluid pressure outlet in said housing formed and adapted for communication with the brakes of a vehicle, a valve between said inlet and said outlet, means responsive to movement of said fulcrum lever structure for opening said valve, a lever arm pivotally mounted externally of said housing and having an end portion pivotally connected with said fulcrum, yielding means urging said fulcrum and lever arm in one direction, and a sensing structure secured to said arm and said vehicle, said sensing structure including a pair of separable elements connected to said vehicle for separation in response to lightening of said vehicle, said sensing structure including a yielding means formed and positioned to urge said separable elements together, said last-named yielding means being preloaded at all positions of said separable elements, at a force greater than that of said first yielding means and the friction within said housing.

2. For use with a vehicle having a body and an axle spaced from said body, a load modulation and relay structure including a housing, a tank pressure inlet in said housing, at least one brake chamber outlet in said housing, a relay valve assembly positioned in said housing to control communication between said inlet and outlet, a service piston in said housing, a fulcrum and lever assembly in said housing and in contact with said service piston and relay valve assembly, said last-named assembly including a pair of pivoted levers and a fulcrum movable therebetween, and means for moving said fulcrum within said fulcrum and lever assembly to vary the action of said relay valve assembly in response to predetermined movement of said service piston, said means including a lever member connected to said fulcrum, a sensing member connected to said lever, one of said members being connected to said body, the other of said members being connected to said axle whereby relative changes in the space between said body and axle produce a change in the position of said fulcrum, said sensing member including a pair of telescoping elements and a spring having its opposite ends secured each to one of said elements, said spring being under a predetermined stress greater than zero when said telescoping members are telescoped to their shortest combined length and under increased stress when said telescoping members are extended beyond said length.

3. For use with a vehicle having a body and an axle spaced from said body, a load modulation and relay structure including a housing, a tank pressure inlet in said housing, at least one brake chamber outlet in said housing, a relay valve assembly positioned in said housing to control communication between said inlet and outlet, a service piston in said housing, a fulcrum and lever assembly in said housing and in contact with said service piston and relay valve assembly, said last-named assembly including a pair of pivoted levers and a fulcrum movable therebetween, and means for moving said fulcrum within said fulcrum and lever assembly to vary the action of said relay valve assembly in response to predetermined movement of said service piston, said means including a lever member connected to said fulcrum, a sensing member connected to said lever, one of said members being connected to said body, the other of said members being connected to said axle whereby relative changes in the space between said body and axle produce a change in the position of said fulcrum, said sensing member including a pair of telescoping elements and a yielding means having its opposite ends secured each to one of said elements, said yielding means being under predetermined stress when said telescoping members are telescoped to their shortest combined length and said body and axle are at their closest spacing, said telescoping members being formed and dimensioned to prevent said yielding means from reaching its free, nonstressed state at any position of said telescoping members.

4. A sensing unit for use with a vehicle having a body, an axle spaced from said body and a valve member carried by said body and having a lever for operating a fulcrum, said unit including a pair of telescoping members, one of said members being connected to said lever, the other of said members being connected to said axle, a yielding means connecting said telescoping members, said yielding means being preloaded at a predetermined force greater than zero when said telescoping members are at their shortest combined length and being increasingly loaded as said combined length is increased.

5. A sensing unit for sensing the space between a vehicle body and a vehicle axle, said unit including a pair of telescoping members, a connection between one of said members and said body, a connection between the other of said members and said axle, and a yielding means connecting said members and having a shorter free length than the shortest combined length of said members, whereby said yielding means is prevented from reaching said free length when said telescoping members are telescoped to their shortest combined length.

6. A sensing unit for sensing the space between a vehicle body and a vehicle axle, said unit including a pair of telescoping members, a connection between one of said members and said body, a connection between the other of said members and said axle, one of said connections being flexible, and a yielding means connecting said members and having a shorter free length than the shortest combined length of said members.

7. A sensing unit for sensing the space between a vehicle body and a vehicle axle, said unit including a pair of telescoping members, a connection between one of said members and said body, a connection between the other of said members and said axle, one of said connections being flexible, the other of said connections being pivotal, and a yielding means connecting said members and having a shorter free length than the shortest combined length of said members.

8. For use with a load modulation valve structure having a movable fulcrum, yielding means urging said fulcrum in one direction and a lever for moving said fulcrum, a sensing unit including a pair of telescoping members, one of said members being connected to said lever, a spring connected to said members and urging the same together, said spring having a force greater than that of said yielding means when said telescoping members are at their shortest combined length.

9. For use with a load modulation valve structure having internal frictional forces, a movable fulcrum, yielding means urging said fulcrum in one direction and a lever for moving said fulcrum, a sensing unit including a pair of telescoping members, one of said members being connected to said lever, a spring connected to said member and urging the same together, said spring having a force greater than the combined force of said yielding means and said frictional forces when said telescoping members are at their shortest combined length.

10. A load modulation and relay structure including a housing, a service inlet and a piston movable in response to service pressure entering said inlet, a relay valve assembly, a movable fulcrum assembly in operating contact with said service piston and said relay valve assembly, and alternate emergency inlets in said housing, one of said emergency inlets being positioned to deliver emergency fluid pressure to operate said service piston and thereby to operate said relay valve assembly through said fulcrum assembly, the other of said inlets being positioned to deliver emergency pressure to operate said relay valve assembly directly.

11. A fulcrum assembly including a shaft, a yoke secured to and extending from said shaft, a pair of roller arms each pivotally carried by said yoke adjacent its distal end and extending within said yoke toward said shaft, a pair of rollers, each of said arms rotatably carrying adjacent its distal end one of said rollers, said rollers lying in the same plane and in contact with each other.

12. For use with a load modulation valve structure having a movable fulcrum, yielding means urging said fulcrum toward one position and a lever for moving said fulcrum, a sensing unit including a pair of telescoping members, one of said members being connected to said lever, a spring connected to said members and urging the same together, said spring having a force greater than that of said yielding means when said telescoping members are at their shortest combined length and said fulcrum is in said one position.

13. For use with a load modulation valve structure having internal frictional forces, a movable fulcrum, yielding means urging said fulcrum toward one position and a lever for moving said fulcrum, a sensing unit including a pair of telescoping members, one of said members being connected to said lever, a spring connected to said members and urging the same together, said spring having a force greater than the combined force of said yielding means and said frictional forces when said telescoping members are at their shortest combined length and said fulcrum is in said one position.

14. Means for sensing and transmitting a semi-permanent change in the distance between a vehicle body element and a vehicle axle element including a pair of telescoping members, each of said members being connected to one of said elements, and a yielding means connected to both of said members and urging said members toward closed, abutting relationship, said yielding means having a predetermined minimum retained stress when said members are in said relationship.

References Cited by the Examiner

UNITED STATES PATENTS

| | | | |
|---|---|---|---|
| 1,842,497 | 1/1932 | Whitaker | 303—22 |
| 2,604,657 | 7/1952 | Tipper | 267—73 X |
| 2,988,376 | 6/1961 | Chausson. | |

FOREIGN PATENTS

| | | |
|---|---|---|
| 137,344 | 5/1950 | Australia. |
| 1,280,737 | 11/1961 | France. |

BENJAMIN HERSH, *Primary Examiner.*

EUGENE G. BOTZ, M. S. SALES, *Assistant Examiners.*